Figure 1:
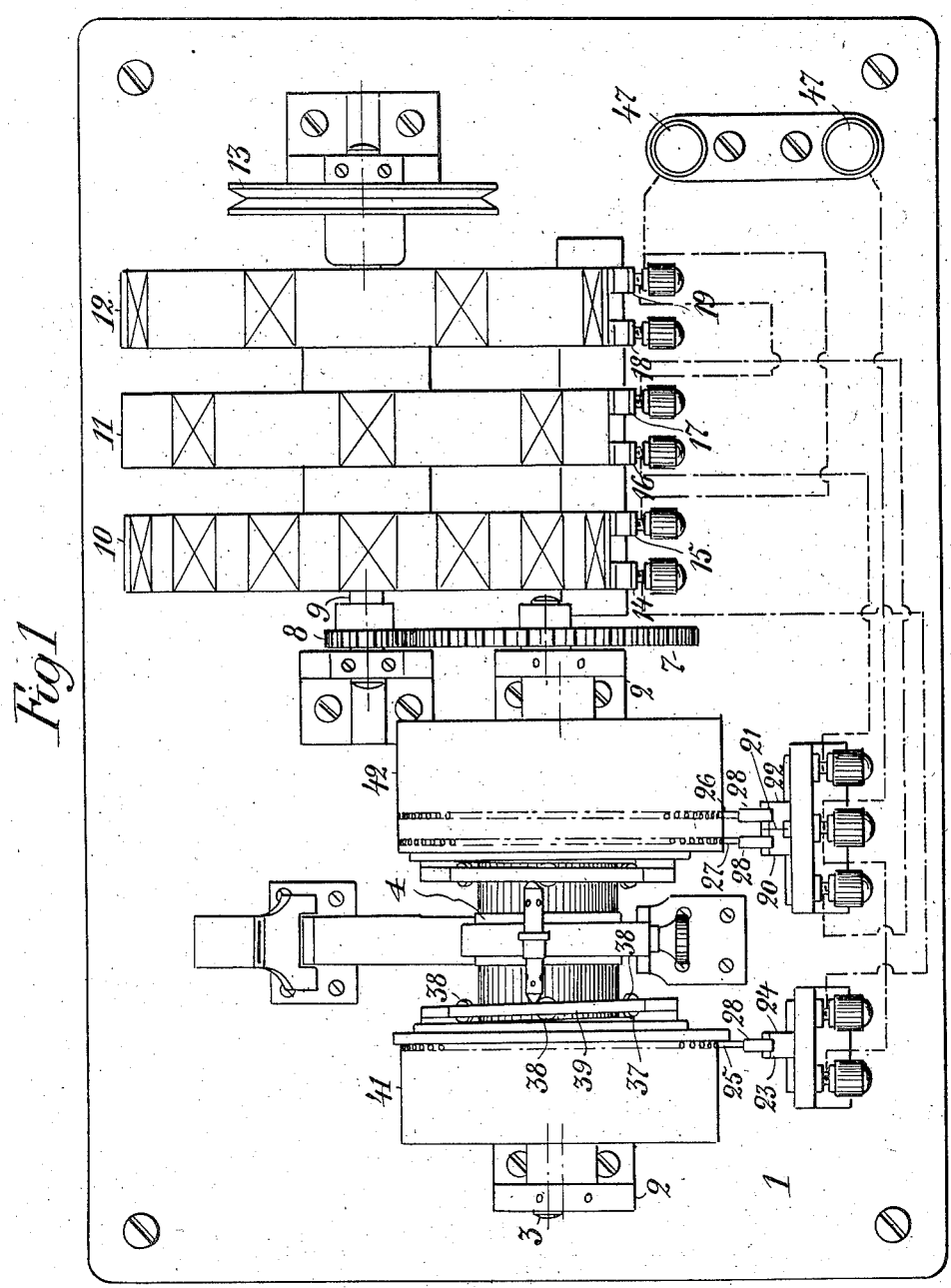

P. O. PEDERSEN.
TRANSMITTING APPARATUS FOR ELECTRIC SIGNALING.
APPLICATION FILED SEPT. 28, 1909.

1,091,159.

Patented Mar. 24, 1914.
5 SHEETS—SHEET 1.

WITNESSES:
Waldo M Chapin
William C. Linny

INVENTOR
Peter Oluf Pedersen
BY Rosenbaum Stockbridge
ATTORNEYS.

P. O. PEDERSEN.
TRANSMITTING APPARATUS FOR ELECTRIC SIGNALING.
APPLICATION FILED SEPT. 28, 1909.
1,091,159.
Patented Mar. 24, 1914.
5 SHEETS—SHEET 2.
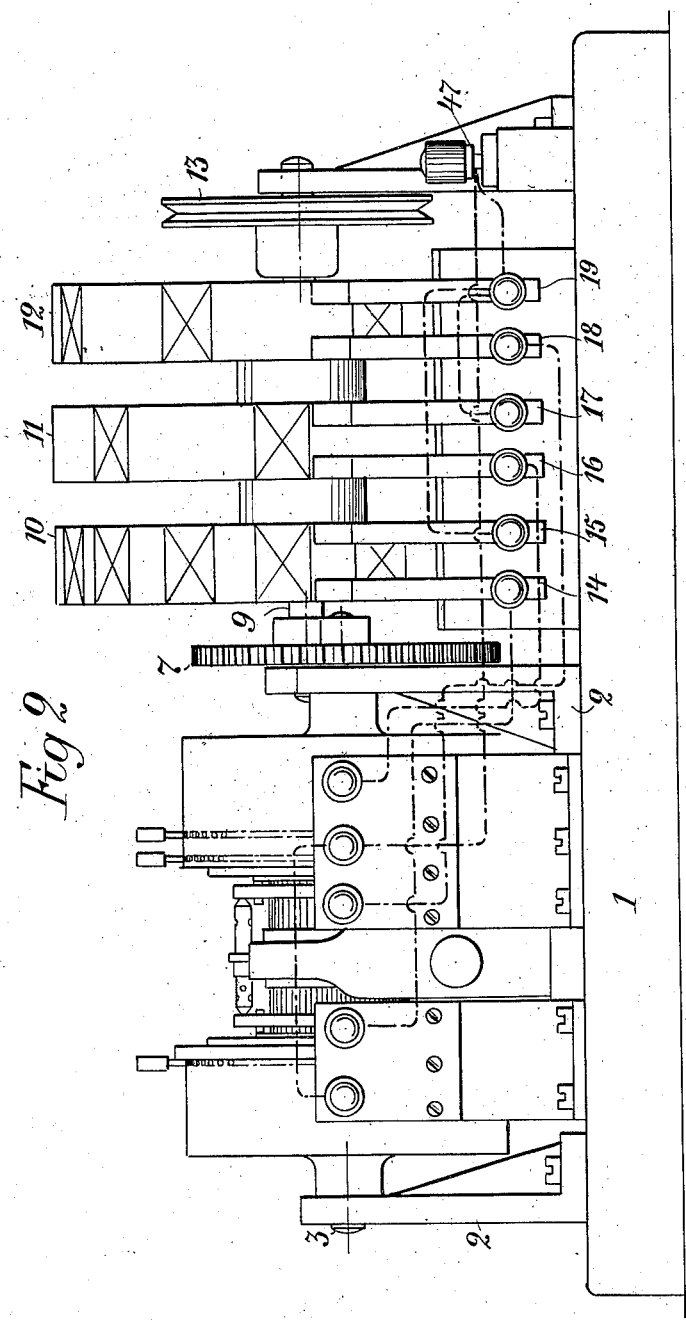
WITNESSES:
INVENTOR
ATTORNEYS.

P. O. PEDERSEN.
TRANSMITTING APPARATUS FOR ELECTRIC SIGNALING.
APPLICATION FILED SEPT. 28, 1909.
1,091,159.
Patented Mar. 24, 1914.
5 SHEETS—SHEET 3.
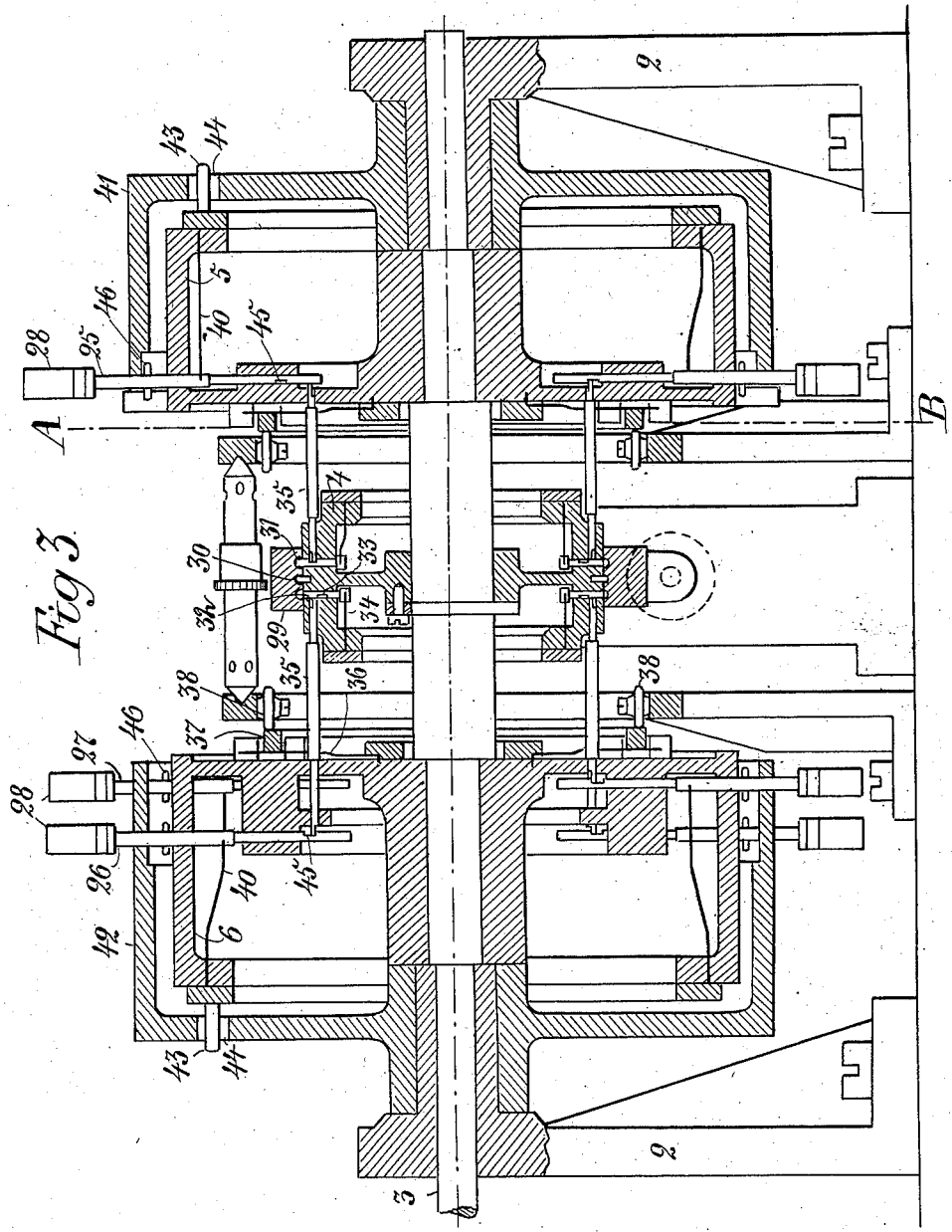
WITNESSES:
INVENTOR
Peder Oluf Pedersen
BY
ATTORNEYS.

P. O. PEDERSEN.
TRANSMITTING APPARATUS FOR ELECTRIC SIGNALING.
APPLICATION FILED SEPT. 28, 1909.
1,091,159. Patented Mar. 24, 1914.
5 SHEETS—SHEET 4.
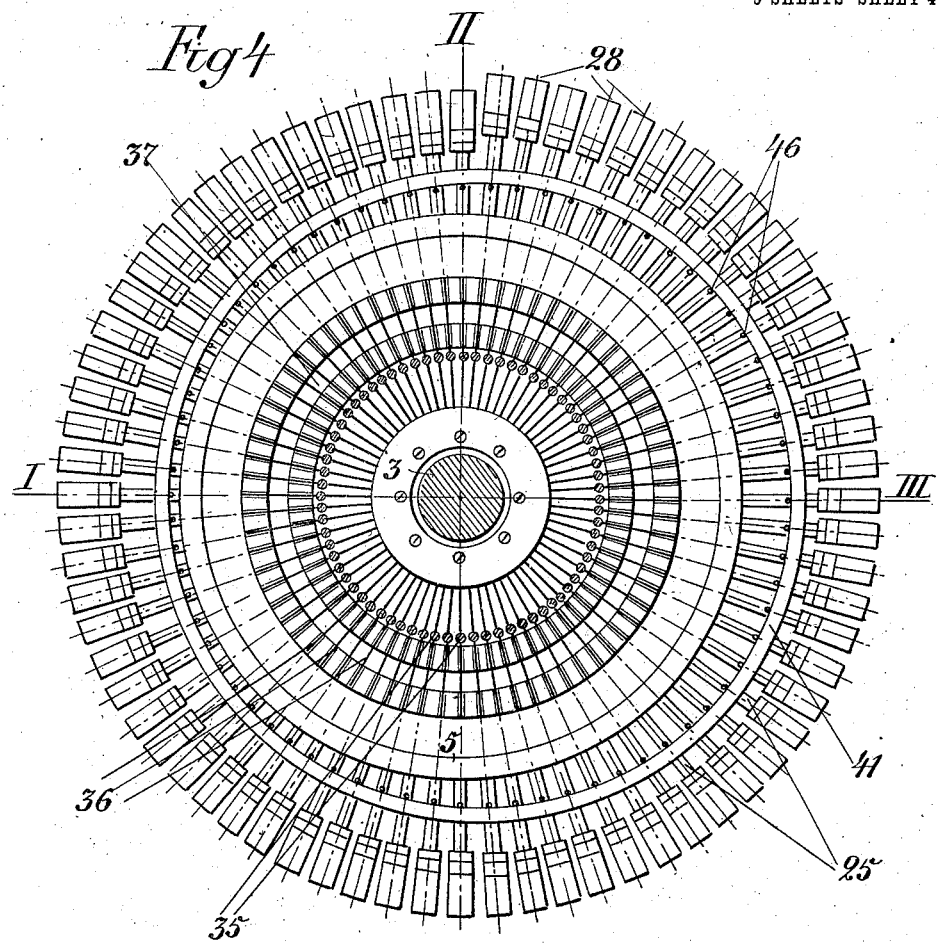
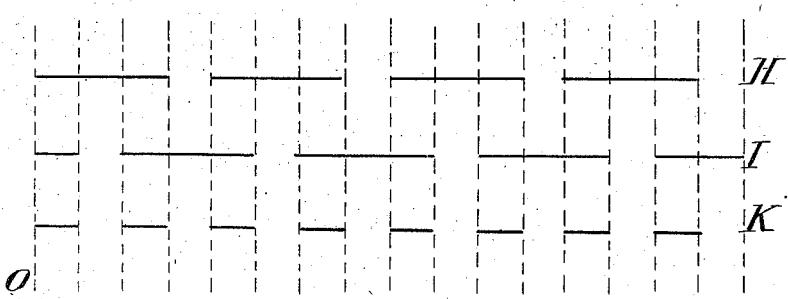

P. O. PEDERSEN.
TRANSMITTING APPARATUS FOR ELECTRIC SIGNALING.
APPLICATION FILED SEPT. 28, 1909.
1,091,159.
Patented Mar. 24, 1914.
5 SHEETS—SHEET 5.
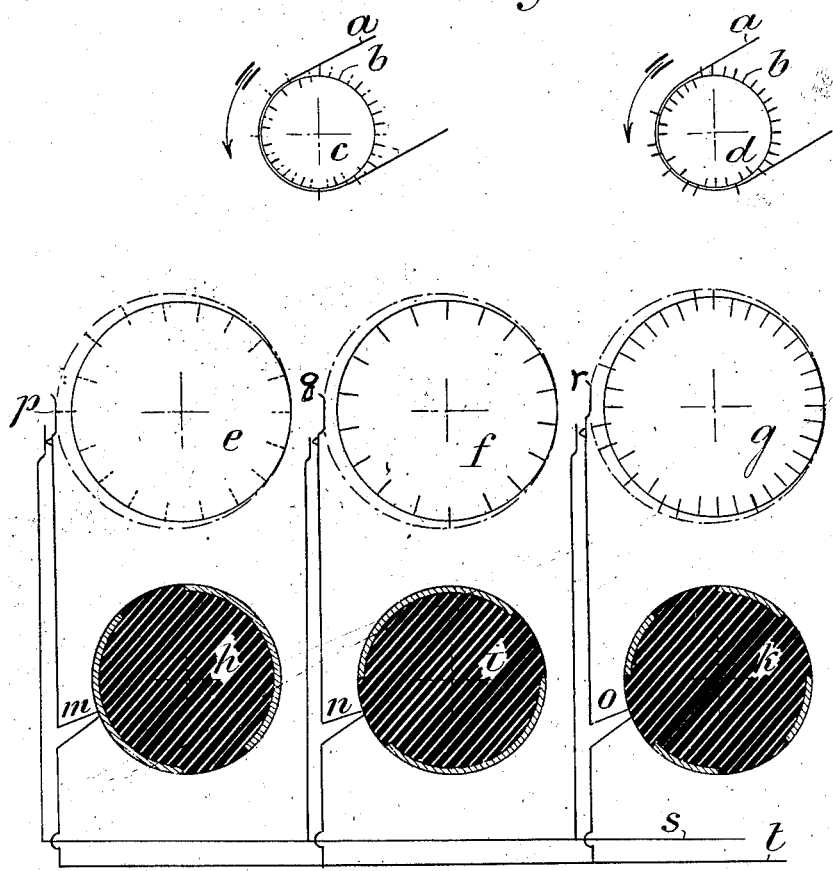

UNITED STATES PATENT OFFICE.

PEDER OLUF PEDERSEN, OF COPENHAGEN, DENMARK.

TRANSMITTING APPARATUS FOR ELECTRIC SIGNALING.

1,091,159.

Specification of Letters Patent.

Patented Mar. 24, 1914.

Application filed September 28, 1909. Serial No. 520,023.

*To all whom it may concern:*

Be it known that I, PEDER OLUF PEDERSEN, engineer, a subject of the King of Denmark, residing at Copenhagen, Denmark, have invented certain new and useful Improvements in Transmitting Apparatus for Electric Signaling, of which the following is a full, clear, and exact description.

Where great quantities of energy are used in transmitting apparatuses for electric signaling, as for example in wireless telegraphy, the closing and interruption of the electric circuits or the production of variations in the same in accordance with the signals, has hitherto been subject to objectionable features. Arcs have been formed between the contact parts, soon damaging the same, even where such parts were made of platinum. The objectionable phenomena are more pronounced and noticeable when the telegraphic apparatus used is designed for continuous and rapid work, it being then necessary to make the contact pieces light and thus more exposed to deterioration by the formation of arcs.

The present invention aims at removing these difficulties by laying the interruptions and closings or the producing of variations of the current at an organ, where the formation of arcs can be reduced most effectively, and which can sustain this formation of arcs, (for instance commutator disks), while the signaling is controlled by means of contacts, which are closed and interrupted at such times, when the circuits, in which they are inserted, are without current. Below is explained how the device can be used for producing interruptions and closings of a circuit in accordance with Morse signals.

In the drawings: Figure 1 shows a top view of a modification of an apparatus according to the invention; Fig. 2 a side view of the same; Fig. 3 a section through part of the apparatus, seen from the opposite side to that shown in Fig. 2; Fig. 4 a section on the line A—B in Fig. 3, showing one of the contact drums; Fig. 5 a circuit diagram; Fig. 6 a perforated paper slip; and Fig. 7 a diagram.

The principle on which the operation of the apparatus is based clearly appears from Figs. 5 and 6. The paper-slip $a$, perforated by a puncher of known kind has two rows of holes, besides the middle row, which is used for the motion of the slip. The holes of one row correspond to the dots, and the holes of the other to the dashes in Morse signals. The paper-slip is inserted in the apparatus on the circumference of a drum with radial pins $b$ which are acted upon by springs, said pins being normally kept down by the paper-slip, except where the slip is provided with holes, through which the pins can protrude. In Fig. 5 $c$ and $d$ indicate drums, each of which is provided with a row of pins, corresponding to dashes and dots respectively. In the apparatus the said pins are disposed relatively near to each other on the same drum, which, between the rows of pins, is provided with teeth for the transport of the paper-slip by means of the middle row of holes in the same. Three drums $e$, $f$ and $g$ are arranged on the same shaft as the drum $c$, $d$, and are provided with radial contact pins, mechanically connected to the pins $b$ in such a way that, when a pin $b$ protrudes above the circumference of the drum, a corresponding pin emerges above the circumference of one of the drums $e$, $f$ or $g$. Each of the pins on the drum $d$ corresponds to a pin on the drum $g$, which pins correspond to the dots in Morse signals, while every other pin on the drum $c$ is connected with a pin on the drum $e$, and each of the remaining pins with a pin on the drum $f$. The pins on the drum $c$ correspond to the dashes in Morse signals.

$h$, $i$, and $k$ indicate commutator disks with thereto belonging couples of sliding contacts $m$, $n$, and $o$ and all of these commutator disks are arranged on the same shaft, which shaft makes a quarter of a revolution when a pin on the drum $g$ has moved to the place of the pin in front of same. In the modification shown the disk $k$ is provided with four conducting segments, each covering one eighth of the circumference, while each of the disks $h$ and $i$ is provided with two conducting segments, each covering three eighths of the circumference of the disk, but co-relatively angularly displaced 90° as shown in the drawing. The sliding-contacts $m$, $n$, and $o$ are arranged in such a manner, that the couples of sliding-contacts $n$ and $o$ are found each in the middle of an insulating part, the sliding contacts $m$ at the same time being disposed in the middle of a conducting segment. When the pins on the drums $e$, $f$, and $g$ protrude above the circumference, they will effect closing of contacts between the contact-springs $p$, $q$, and $r$ respectively, and the duration of such a contact closing is such that the closure is effected at the moment when the corresponding sliding-contacts $m$, $n$ or $o$ are found in the middle of an insulating part, while the interruption of the contact between the springs $p$, $q$, or $r$ is effected when the corresponding sliding-contacts $m$, $n$, or $o$ are found in the middle of the next following insulating part. $s$ and $t$ indicate the wires, between which closing and interrupting in accordance with Morse signals is to take place, and the contacts $m$ and $p$ are arranged in series; likewise $n$ and $q$ and $o$ and $r$, as it appears from the drawing, while the three couples of contacts are arranged in parallel in relation to the wires $s$ and $t$.

The device acts in the following manner: If in the paper-slip a hole be found corresponding to a dot, and a pin on the drum $d$ protrudes through the same, the corresponding pin on the drum $g$ will protrude and effect contact between the springs $r$ when passing same during the rotation of the drum. The contact point between the springs $r$ is at the first moment without current because the sliding-contacts $o$ arranged in series with the same are disposed on an insulating part, and the circuit is only closed by the sliding-contacts $o$ being connected through a conducting segment. When the same has passed the sliding-contacts $o$ the circuit is interrupted, and only then the pin on the drum $g$ permits the contact-springs $r$ to separate from each other. It is thus understood that the duration of the closing of the circuit corresponds to the time required by a conducting segment on the disk $k$ for moving its own breadth, and that closing and interruption and the formation of sparks incurred thereby, solely take place at the said segments and not at the contact-springs $r$. In the same manner a hole in the paper-slip corresponding to a dash will effect a closing of circuit, for instance through the contact springs $n$ and $q$, lasting three times the time corresponding to a dot, the breadth of a conducting segment on the disk $i$ being three times as large as that of a conducting segment on the disk $k$. As will be seen the pins corresponding to the dashes are divided into two parts, each of which has a separate commutator-disk. The reason for such construction is, that on a commutator-disk corresponding to dashes only half as many segments as on a commutator-disk corresponding to dots can be had, as a dash plus a space must be double as long as a dot plus a space, and it is not possible to produce all imaginable combinations by means of one single disk corresponding to dashes. This will clearly appear from Fig. 7. By means of the disk $i$ a series of dashes I can be produced, and some of these can be left out, and by means of the disk $k$ a series of dots K can be produced, which dots are placed as shown in the drawing in relation to the dashes, and more or less of these dots can be left out. By means of these two disks it is not possible to produce all combinations of Morse signals.

If the length of a dot be designated L (and thus also the length of a space designated L), the Morse-system requires that it must be possible, starting from a certain point O, Fig. 7, to commence a signal (dot or dash) at a distance from O equal to $o$, 2L, 4L, 6L, etc., or in other words at a distance from O equal to an even multiple of L. As regards the dots the disk $k$ will be able to comply with this requirement, while the disk $i$ is only able to commence a dash at a distance from O equal to 2L, 6L, 10L, etc., or in other words at a distance from O equal to twice an uneven multiple of L.

If a second disk $h$ be at disposal, by means of which it is possible to produce a series of dashes H placed in relation to the other dashes and the dots in the manner represented in Fig. 7, it is possible by means of the same to produce dashes commencing at a distance from O equal to $o$, 4L, 8L, 12L, etc., or in other words at a distance from O equal to twice an even multiple of L. It is thus always possible (either by means of the disk $i$ or $h$) to produce a dash commencing at a distance from O equal to an even multiple of L.

Of course the modification shown is only to be considered as an example, and any other number of pins and segments can be used without altering the principle.

Carrying out in practice an apparatus working in accordance with the above principle, it is to be considered, that the work effected by the paper-slip by pressing in the pins on the drum $c$, $d$, cannot be very great, as the paper would then be perforated by the pins, and each of the pins on the drum $c$, $d$ could not thus be simply connected with the corresponding pin on the drums $e$, $f$, and $g$ in such a manner, that the pressing in of a pin on the drum $c$, $d$ effects withdrawing of a spring-influenced pin on the drums $e$, $f$, or $g$, as this would require an amount of energy so considerable, that the paper-slip would be perforated by the pins. An arrangement has therefore been provided according to which the pins on the drums $e$, $f$, and $g$ before commencing to act, are found in a withdrawn spring-actuated and locked position, and the pressing down of a pin on the drum $c$, $d$ only causes releasing of the pin in question on the drum $e$, $f$, or $g$, some time before the pin is to act. The withdrawal of the pin in question against the actuating spring and the locking is effected by means of the energy effecting the rotation of the drums.

In Fig. 1, a base-plate 1 has arranged thereon the uprights 2 which carry the bearings of a shaft 3, on which latter are mounted the drums 4, 5, and 6; best shown in Fig. 3. The drum 4 corresponds to the drum c, d, diagrammatically indicated in Fig. 5; while the drum 5 corresponds to the drum g, and the drum 6 to the drums e and f of said figure. The shaft 3 carries on one end thereof a gear 7, which meshes with the pinion 8 on the shaft 9; which shaft carries three commutator-disks 10, 11, and 12, corresponding to the disks g, f, and e, of Fig. 5 respectively. While in Fig. 5 only a few segments are shown on the commutator-disks, a greater number are used in practice; but the gearing between the two shafts 3 and 9 is chosen in such a manner, that the action becomes nevertheless the same i. e. a pin on the drum 4 moves to the place occupied by the pin in front at the same time as a segment on the disk 10 moves to the place of the segment in front of same. The length of the conducting segments on the disks 11 and 12 is about three times as large as the length of a segment on the disk 10. The shaft 9 is rotated by means of a motor and the pulley 13. The insulating parts on the disks 10, 11, and 12 are in the drawings marked with a cross. Against the circumference of each of the disks 10, 11, and 12 are a plurality of sliding contact-springs, 14, 15; 16, 17, and 18, 19 respectively, corresponding to the sliding-contacts m, n, and o, Fig. 5. The contacts corresponding to the contact couples p, q, and r are indicated by 20, 21; 21, 22; and 23, 24 and consist of springs which can be connected conductively with each other when the pins 25, 26, and 27 on the drums 5 and 6 are located in a protruding position, said pins carrying the tube-pieces 28 on their extremities, and being insulated from the same; such pieces effecting electrical connection as indicated in Fig. 1.

The drum 4 is partly surrounded by a fixed screen 29, and the paper-slip is introduced between the latter and the drum. The screen is provided with grooves opposite to the series of pins on the disk 4. The middle series of pins 30 serves for transport of the paper in the known manner; the series of pins 31 corresponds to the dots, and the series of pins 32 to the dashes, and the pins are pressed down through the insertion of the paper-slip, with exception of where holes are found in the latter, through which holes the pins in question can protrude into the grooves in the screen 29. The pins 31 and 32 are on the sides provided with a notch 33 and each pin is kept outward by means of a spring 34. For each pin 31 and 32 is provided a horizontal rod 35, actuated by a spring 36 which presses said rods against the sides of the pins 31 and 32. The springs 36 pass through the holes in the rods 35 and can be acted upon by a ring 37 rotating with the drum (5 or 6), and are kept pressed against the row of springs 36 with a suitable pressure, the said rings being kept in a suitable oblique position, as shown in Fig. 1, by means of a fixed ring 39, provided with rolls 38. The drum 5 is provided with as many radial pins 25 as there are pins 31, and each of the pins 25 is acted upon by a spring 40 which tends to press the same outward. Each of the drums 5 and 6 is surrounded by a bowl-shaped cap 41 and 42, the axis of rotation of the same being disposed at the same height as that of the shaft 3, but somewhat laterally displaced toward the contact-springs 20—24 (Figs. 1 and 4). The motion is transmitted from the drums 5 and 6 by means of pins 43 passing loosely through holes 44 in the bottom of the caps 41 and 42. The pins 25, 26, and 27 are on the sides provided with notches 45, in which the ends of the rods 35 can engage when the pins are pressed in. The pins 25, 26, and 27 are likewise provided with transverse-pins 46, limiting the outward movement of the pins by striking against the inside of the wall of the caps 41 and 42, and thereby serves to force back the pins during the rotation of the operative parts.

The parts of the apparatus are electrically connected in the manner clearly appearing from the dotted lines in Fig. 2. The terminals by which the apparatus is connected to the source of the current which is to be interrupted or closed are indicated by 47.

The apparatus acts in the following manner: In the position I to the left in Fig. 4 a pin 25 has been pressed in on account of the eccentric mounting of the cap 41. The corresponding rod 35 then engages in the notch 45 and is kept in this position owing to the ring 37, which is placed obliquely in relation to the drum, pressing against the corresponding spring 36. It will be seen that a rod 35 by a pin, for instance 32, Fig. 3, is prevented from moving toward the middle of the apparatus and from being disengaged from the notch 45 and letting loose the corresponding pin 26 as long as the pin 32 is kept pressed down by the paper-slip. In the position II, Fig. 4, the ring 37 will cease acting upon the row of springs 36, and the freeing or non-freeing of the pin 26 will thus depend upon whether the pin 32 is out or in. The shown position of the parts correspond to the position, which they will assume when the apparatus is rotated without any paper-slip being inserted. If a perforated paper-slip be inserted, only the pins 31 and 32 registering with the holes will protrude, thus releasing the corresponding pins 25, 26, and 27, while the other pins are kept down by the paper, thereby preventing the pins 25, 26, and 27 in question from being released. When a pin 25, 26, or 27 has assumed its outermost position, it will in the position III, Fig. 4, incur closing of the circuit between the contact-springs 23, 24; 21, 22; or 20, 21 respectively. When the rotation of the drum is continued so as to bring the pins 25, Fig. 4; from the position III back to the position I, the eccentric cap 41 will act upon the transverse-pins 46 and thereby bring back all of the pins 25, which might have been released.

It will be seen, that all that the paper-slip has to do during its passage through the apparatus is to press in the small pins 31 and 32 which do not meet with any hole in the paper slip, and further, that all the working parts of the apparatus have plenty of time for effecting their functions. For instance a pin 25, Fig. 4, will have at its disposal, for emergence, the time required by the drum for making a quarter of a revolution (from the position II to the position III) and half a revolution (from the position III to the position I) for being carried back.

Having now particularly described and ascertained the nature of the said invention and in what manner the same is to be performed, I declare that what I claim is:—

1. In combination in a transmitting apparatus for automatic electric signaling, a signal emitting controlling device comprising a plurality of revoluble drums, contact making parts, and radially movable members carried by said drums, a spark-arresting device including contact making elements for preventing sparking between said contact making parts, electrical connections co-acting with said devices to form a partial circuit, and mechanism for operating said contact making parts and elements, contact between the elements aforesaid being effected before contact is made between the contact making parts aforesaid, and the partial circuit being interrupted at the spark arresting device before said parts are separated.

2. In combination in a transmitting apparatus for automatic electric signaling, a signal-emitting controlling device comprising contact making parts, a spark-arresting device for preventing sparking between said contact making parts, said coöperating device including auxiliary contact making elements, and mechanism for operating both of said devices, the auxiliary contact making elements being operable by said mechanism in advance of the contact making parts when making circuit, and after the said parts when breaking said circuit, said auxiliary contact making elements being normally energized when actuated to make or break circuit.

3. In combination in a transmitting apparatus for automatic electric signaling, a signal emitting controlling device comprising contact making parts, a spark-arresting device for preventing sparking between said contact making parts, including rotatable and stationary contact making elements, electrical connections co-acting with said devices to form a partial circuit, and mechanism for rotating said parts and elements at predetermined proportional speeds, contact between the contact making elements being effected by said mechanism before contact is made between the contact making parts aforesaid, and the partial circuit being interrupted at the spark-arresting device before said parts are separated, said auxiliary contact making elements being normally electrically energized when actuated to make or break circuit.

In witness whereof, I subscribe my signature, in the presence of two witnesses.

PEDER OLUF PEDERSEN.

Witnesses:
  Viggo Blom,
  C. V. Schon.